(12) United States Patent
Lei

(10) Patent No.: US 6,401,579 B2
(45) Date of Patent: *Jun. 11, 2002

(54) WORK HOLDING APPARATUS

(75) Inventor: Xun Lei, Cheswick, PA (US)

(73) Assignee: Delta International Machinery Corp., Jackson, TN (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/253,636

(22) Filed: Feb. 19, 1999

(51) Int. Cl.[7] ................................................. B26D 1/00
(52) U.S. Cl. .............................. 83/13; 83/733; 83/439; 83/445; 144/287
(58) Field of Search .......................... 83/733, 439, 440, 83/441, 444, 445, 13; 144/287

(56) References Cited

U.S. PATENT DOCUMENTS

| | | | | |
|---|---|---|---|---|
| 2,720,897 A | * | 10/1955 | Kairath | 83/439 |
| 3,995,521 A | * | 12/1976 | Rouchdy | 83/733 |
| 4,027,566 A | * | 6/1977 | Harrill | 83/733 |
| 4,058,150 A | | 11/1977 | Pennington | 144/1 R |
| 4,164,882 A | * | 8/1979 | Mericle | 83/409 |
| 4,244,253 A | * | 1/1981 | Flanigan | 83/733 |
| 4,630,656 A | | 12/1986 | Collins | 144/134 D |
| 4,687,383 A | | 8/1987 | Shimomura et al. | 407/46 |
| 4,693,155 A | * | 9/1987 | Ledford, Jr. | 83/733 |
| 5,231,905 A | * | 8/1993 | Trahan | 83/439 |
| 5,261,304 A | * | 11/1993 | Stollenwerk et al. | 83/733 |
| D352,510 S | | 11/1994 | Sutton et al. | D15/138 |
| 5,452,751 A | | 9/1995 | Engler, III et al. | 144/1 F |
| 5,617,909 A | | 4/1997 | Duginske | 144/253.1 |
| D416,919 S | * | 11/1999 | Lei | D15/140 |

OTHER PUBLICATIONS

Instruction Materials for Delta Model 28–193 Circle Cutting Attachment, dated Apr. 30, 1998.

* cited by examiner

Primary Examiner—M. Rachuba
Assistant Examiner—Kim Ngoc Tran
(74) Attorney, Agent, or Firm—Kirkpatrick & Lockhart LLP

(57) ABSTRACT

A workpiece holding apparatus for holding and guiding a workpiece relative to a device having a driven cutting or abrading member includes a base having a workpiece support surface and a first track therein. The apparatus further includes a track-mounted member having a void. The track-mounted member is selectively securable within the void at a desired position along the track. A workpiece mounting member is provided that is slidable within the void.

23 Claims, 10 Drawing Sheets

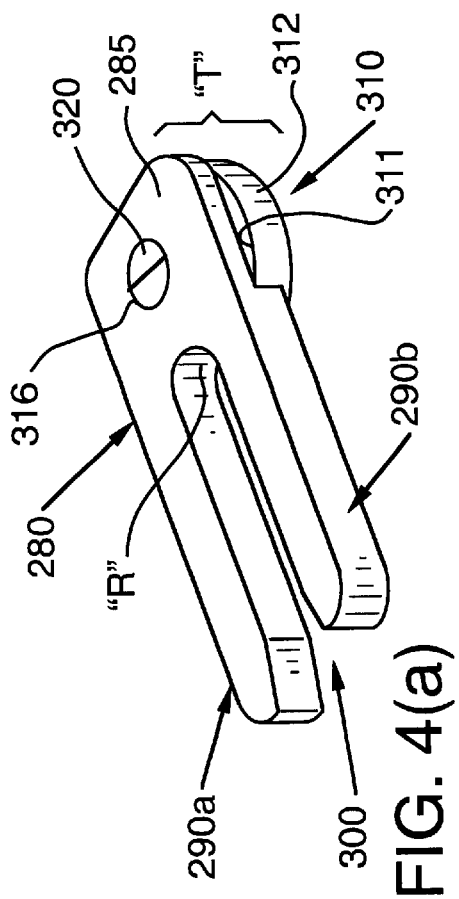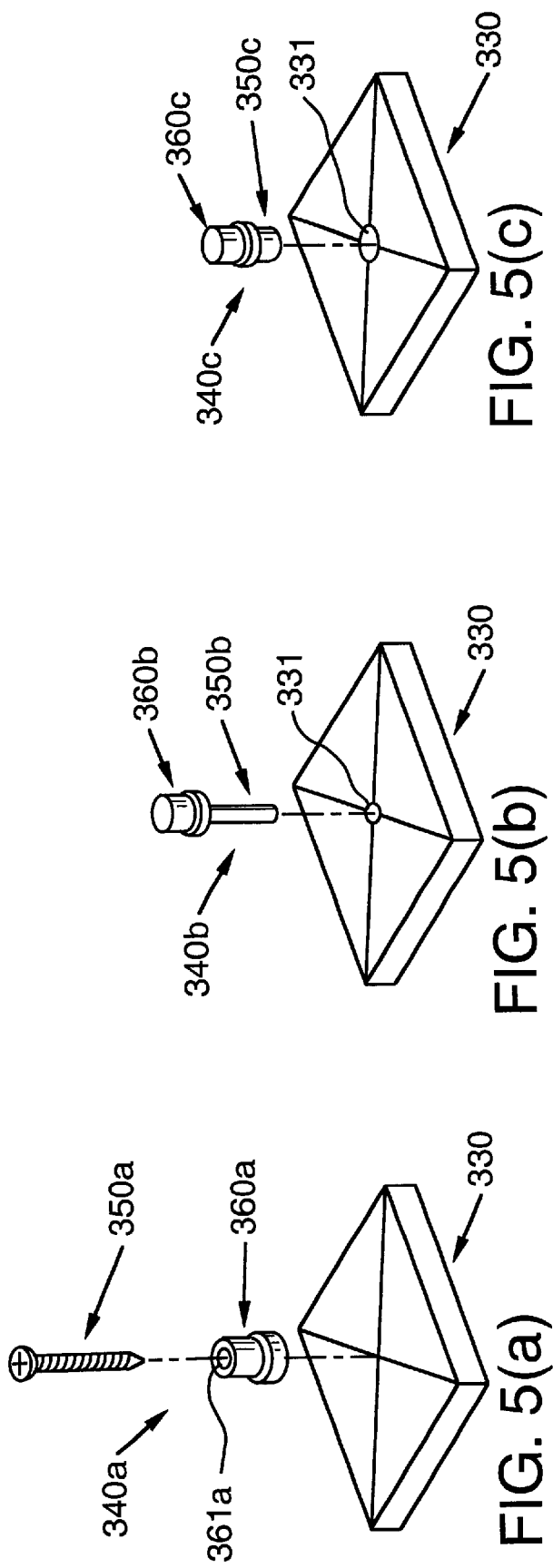

WORK HOLDING APPARATUS

CROSS-REFERENCE TO RELATED APPLICATIONS

Not applicable.

FEDERALLY SPONSORED RESEARCH

Not applicable.

BACKGROUND OF THE INVENTION

1. Field of the Invention

The present invention relates to an apparatus for holding and guiding movement of a workpiece relative to a cutting or abrading member. The invention more particularly relates to an apparatus for holding and guiding movement of a wooden, metal, or other type of workpiece relative to a cutting or abrading member to assist an operator in cutting or abrading a circular perimeter. The invention finds application in any field wherein it is desirable either to provide a workpiece with a circular perimeter or to sand or otherwise abrade the circular perimeter of a workpiece. Examples of application of the present invention include use in woodworking or metal working.

2. Description of the Invention Background

Stationary woodworking saws such as, for example, band saws, scroll saws, and jig saws, may be used to provide a curved perimeter on a workpiece. In such applications, the wooden workpiece may be rotated or otherwise manipulated against the saw's driven saw blade to create the desired perimeter shape. Providing a workpiece with a circular perimeter in this way may be especially difficult because it is difficult to manually manipulate the workpiece in a path relative to the saw blade that is perfectly or even substantially circular. Minor variations in the perimeter of the finished product from a symmetric circular shape may be evident to the naked eye. Also, manually manipulating the workpiece against the saw blade to form a circular perimeter can be time consuming because the precision required to rotate the workpiece dictates moving the workpiece very slowly relative to the saw blade. If a large circular perimeter is desired, the task may be impossible to complete on a typical band saw because of the relatively small surface area provided on standard workpiece support tables associated with such machines.

Even if a workpiece having a circular perimeter has been cut successfully, one may desire to sand the perimeter. Sanding the circular perimeter manually with, for example, a hand-held sander, may be difficult and time-consuming, and uneven application of the sander to the perimeter may destroy the circular character of the workpiece.

Devices are known for assisting an operator to cut a circular perimeter using a band saw. For example, the DELTA™ Model No. 28-193 Circle Cutting Attachment ("the DELTA attachment") includes a table attachment that is secured to the band saw table. The table attachment includes a series of holes spaced along its length, and into which a pin may be inserted. The pin extends a short distance above the top surface of the attachment. To cut a circle, the pin is secured to the workpiece at the desired central point of the circle, and the pin is inserted into an appropriate hole in the table attachment. The workpiece is then simply rotated against the saw blade about the central axis defined by the pin. The distance from the center of the selected hole to the saw blade will be the circular radius.

Although the DELTA attachment effectively produces circular perimeters, because the holes in the table attachment are at predetermined locations, the available circle sizes may be limited. Achieving certain circular diameters within the capability of the device may require fine adjustment of the position of the table attachment relative to the saw blade. Also, the table attachment can support only a limited workpiece size and, therefore, the maximum circular diameter that can be cut using the device is relatively limited. In addition, to cut a desired circular perimeter, at least one point on the desired circular perimeter must be exposed so that the saw blade may initiate the cut at that point and cut along the desired circular perimeter in one rotation of the workpiece. Thus, it may be necessary to pre-cut the workpiece so as to expose the starting point. Such pre-cutting increases complexity, requires additional time, and, if not executed carefully and precisely, may mar the workpiece and necessitate that it be discarded.

A circle cutting attachment is disclosed in U.S. Pat. No. 5,617,909, issued to Duginske. The attachment includes an auxiliary plywood table that is added to support larger workpieces on a band saw table. A track is provided in the auxiliary table. Within the track is place a stop with a drilled hole into which is pressed a sharpened nail. The stop is fitted into a slot of the track and secured therein by a set screw. To cut a circular perimeter, the distance between the nail and the saw blade represents the radius of the circle that will be cut. The Duginske design allows for placement of the center point of the desired circular shape at any fixed position along the track. However, as with the above-described known Delta attachment, in order to cut a desired final circular perimeter, a point on the desired perimeter must be accessible to the saw blade as the starting point for the cut.

Thus, considering the limitations of the above-described known work holding attachments, there exists a need for a workpiece holding apparatus that may be used to easily and quickly cut or abrade a circular perimeter on workpieces of various size, and without a need for careful and precise pre-cutting of the workpiece.

BRIEF SUMMARY OF THE INVENTION

In order to address the forgoing needs, the present invention provides a workpiece holding apparatus for positioning a workpiece relative to a machine having a driven member such as a cutting or abrading member. The work holding apparatus includes a base having a workpiece support surface and a first track therein, and further includes a track-mounted member having a void therein. The void may be in the form of, for example, an open-ended slot defined, at least in part, by opposed first and second arms. The track-mounted member is selectively securable within the first track at a desired position along the first track. The work holding apparatus of the invention also includes a workpiece mounting member that is slidable within the void. The workpiece is attached to or otherwise mounted on the workpiece mounting member, the workpiece mounting member is disposed within the void, and the workpiece may be rotated on the track-mounted member about a point defined by the workpiece mounting member to contact the driven cutting or abrading member.

The present invention also is directed to a unique cutting method for cutting a workpiece on a device having a driven cutting member so as to provide a circular perimeter to the workpiece. The method includes providing an apparatus for positioning the workpiece relative to the cutting member. The apparatus generally includes: a base having a workpiece support surface and a track therein; a track-mounted member that is selectively securable along the track and that includes a void; and a workpiece mounting member that is movable within the void. The workpiece is mounted on the workpiece mounting member, and the workpiece mounting member is disposed within the void. The workpiece is rotated to contact the cutting member, while simultaneously advancing the workpiece mounting member along the void toward the cutting member.

The workpiece holding apparatus of the present invention may be adapted to be secured to the workpiece support table of a cutting or abrading device and may be used to provide workpieces with circular perimeters in a quick and efficient manner. The workpiece holding apparatus of the invention may be adapted for use with workpieces of relatively large dimensions and may be used to cut circular perimeters by way of the foregoing unique cutting method. By way of the unique cutting method, the operator need not pre-cut the workpiece and expose a point on the desired circular perimeter as the starting position for the cut created by the driven cutting member. The apparatus of the invention also may be adapted to assist in the quick and efficient abrading of existing circular perimeters of workpieces.

Thus, the present invention addresses deficiencies in the existing workpiece holding devices used for cutting and/or abrading circular perimeters. Those of ordinary skill will readily appreciate the foregoing and other details, features, and advantages as the following detailed description of embodiments of the invention proceeds.

BRIEF DESCRIPTION OF THE DRAWINGS

In the accompanying figures, there are shown present preferred embodiments of the invention wherein like reference numerals are employed to designate like parts and wherein:

FIG. 4(a) is an isometric view of a track-mounted member in the form of a block member of the embodiment of the present invention shown in FIG. 1;

FIG. 4(b) is an elevational view in isolation of the clamping member of the block member shown in FIG. 4(a);

FIGS. 5(a) through 5(c) illustrate possible center pins that may be used with the embodiment of the present invention shown in FIG 1.

DETAILED DESCRIPTION OF EMBODIMENTS OF THE INVENTION

While the present invention is susceptible of embodiment in many different forms, this specification and the accompanying drawings disclose only some specific forms as examples of the invention. The invention is not intended to be limited to the embodiments so described, and the scope of the invention is generally provided in the appended claims.

For ease of description, the invention and devices to which it may be attached may be described herein in a normal operating position, and descriptive terms such as upper, lower, horizontal, proximal, distal, etc., may be used with reference to the normal operating position and/or the normal position of an operator using the invention on a device on which it is mounted. It will be understood, however, that the apparatus of the invention may be manufactured, stored, transported, used, and sold in orientations other than the positions described.

The work holding apparatus of the invention may be used with certain conventional components of, for example, band saws, metalworking machines, and sanding devices, and the details of those conventional components, although not fully described or illustrated herein, will be apparent to those having ordinary skill in the art and an understanding of the necessary functions of such components.

The term "workpiece" is used herein to refer to any object or other article, of any material, that is to be cut and/or abraded by the device to which the work holding apparatus of the present invention is connected.

Figure 1:
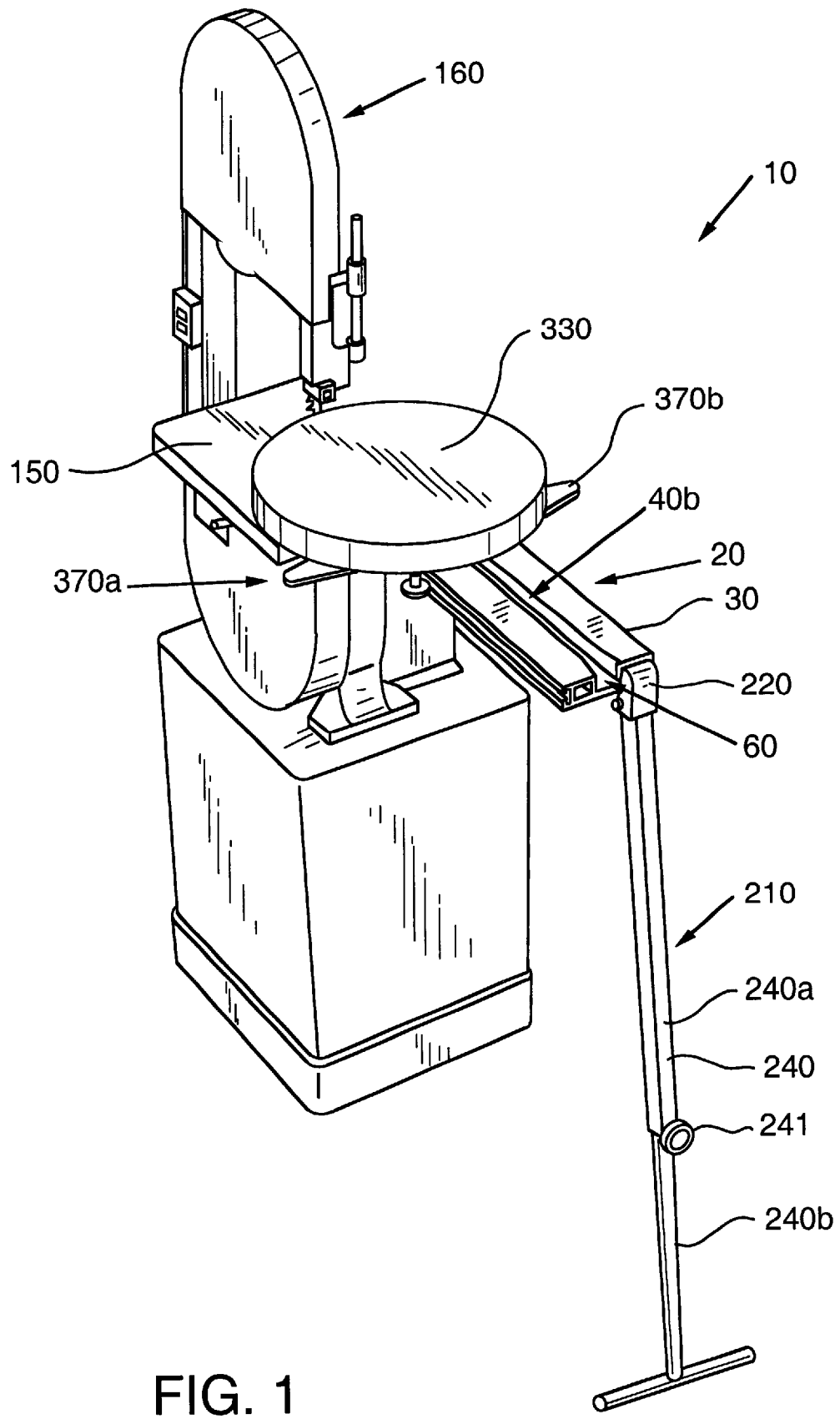
FIG. 1 is an isometric view of an embodiment of a work holding apparatus of the present invention, shown attached to a workpiece support table of a band saw and with a workpiece disposed thereon.
Figure 2:
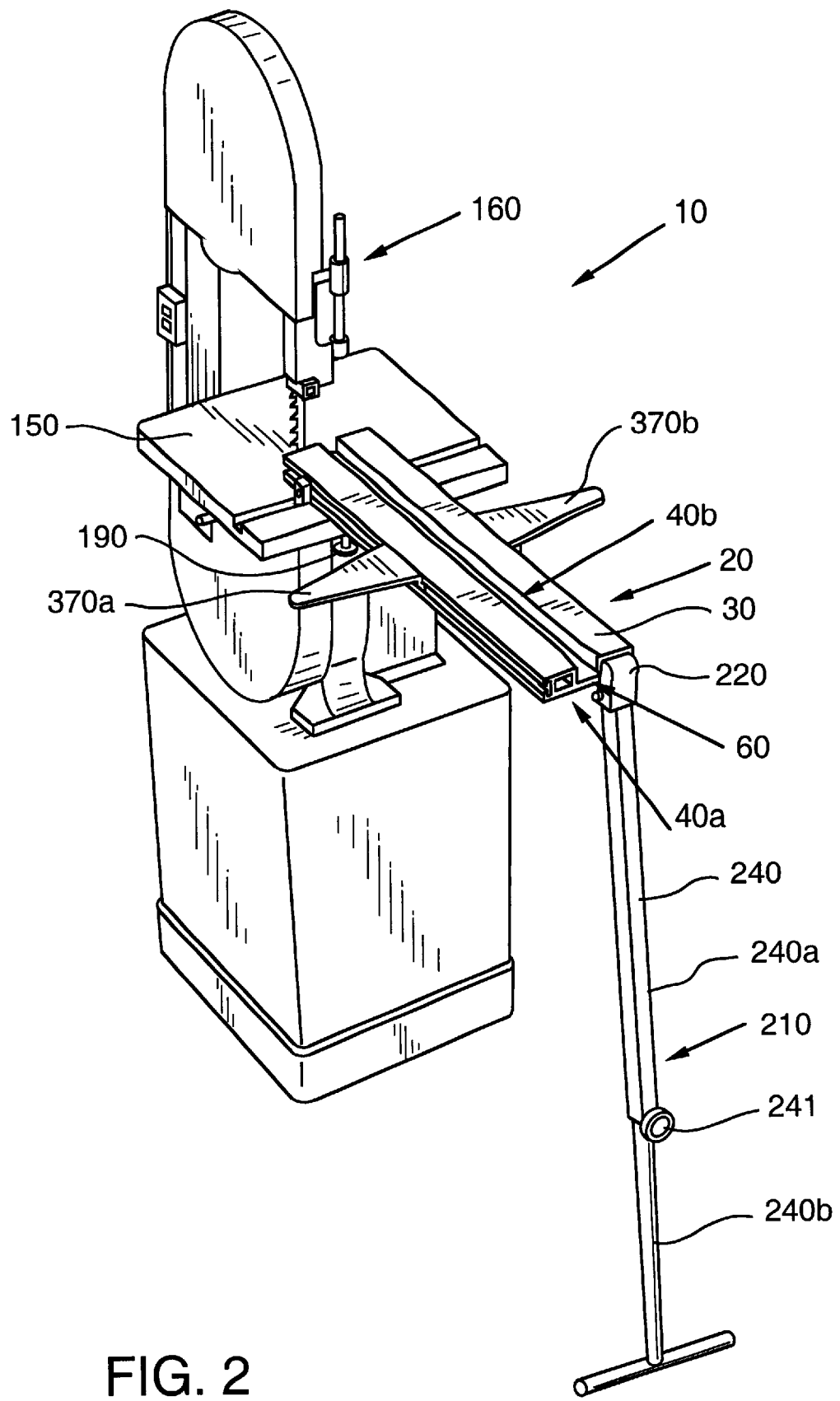
FIG. 2 is an isometric view of the embodiment of the present invention in the environment shown in FIG. 1, and with the workpiece removed therefrom.
Figure 11:
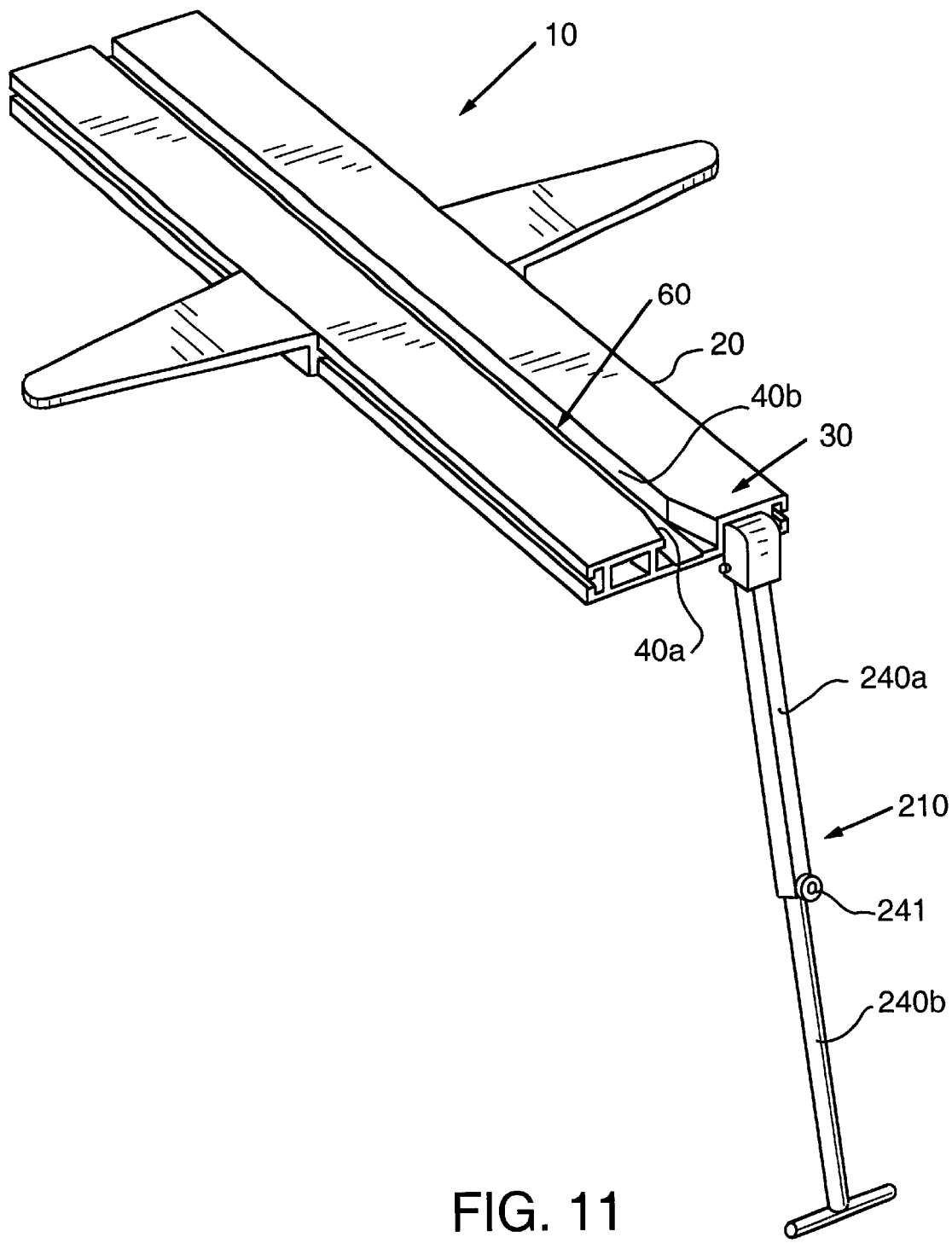
FIG. 11 is an isometric view in isolation of the embodiment of the present invention shown in FIG. 1.

Referring now to the drawings for the purpose of illustrating embodiments of the invention only and not for the purpose of limiting the same, FIGS. 1, 2, and 11 depict an embodiment of the work holding apparatus of the invention in the form of a circle cutting and sanding jig 10. As can be seen from FIGS. 1, 2, and 11, the circle cutting and sanding jig 10 comprises a base 20 with a top surface 30. The base 20 may be formed as, for example, an aluminum extrusion. The base 20 may be mounted on a workpiece support table of the cutting or abrading device to which it is attached, such as, for example, the workpiece support table 150 of the band saw 160 shown in FIG. 1. The top surface 30 of the base 20 includes a pair of internal walls 40a and 40b that define a track 60 that opens on the top surface 30.

Figure 3:
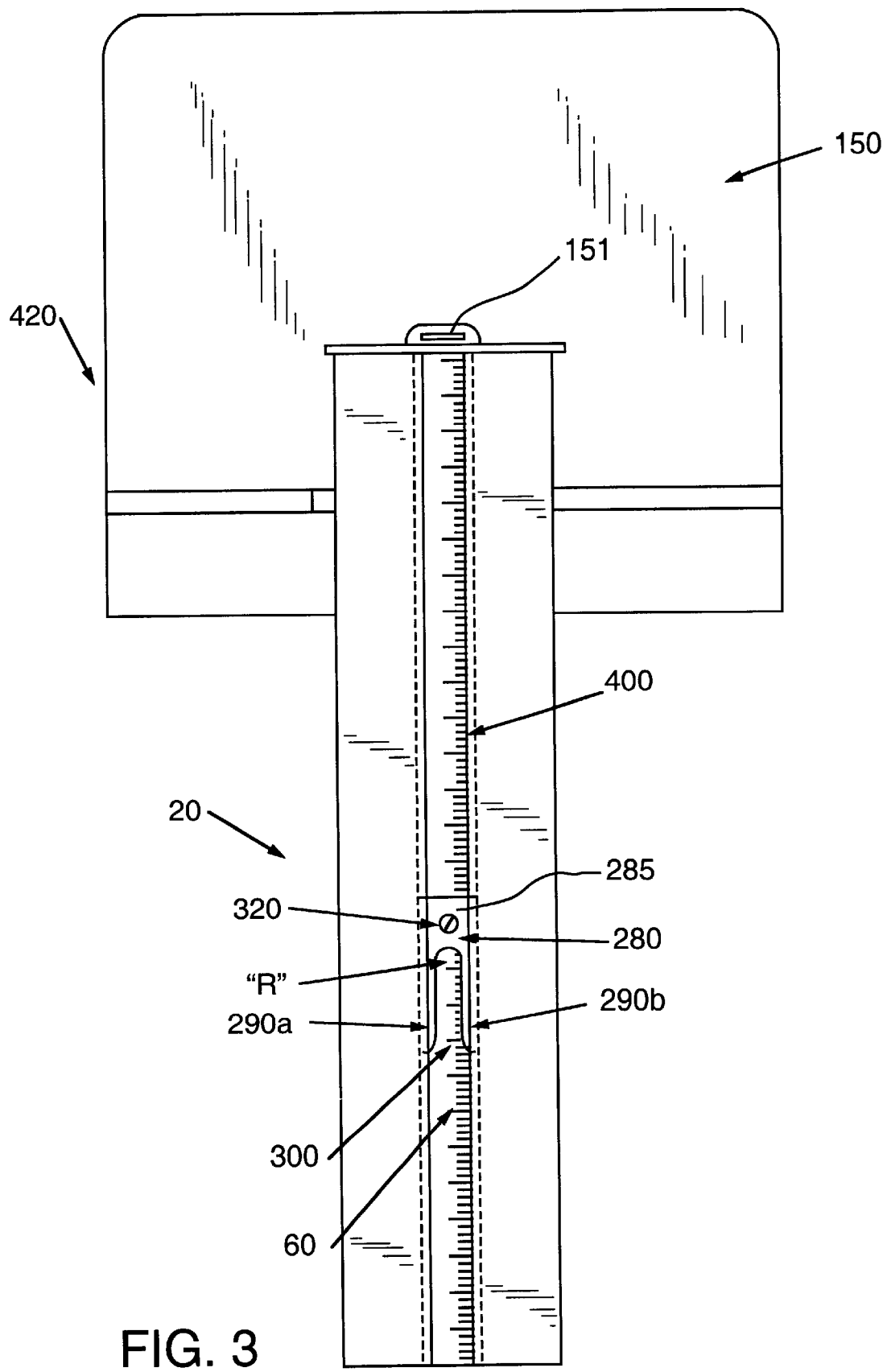
FIG. 3 is a plan view of the base of the embodiment of the present invention shown in FIG. 1, with a track-mounted member in the form of a block member inserted therein and illustrated attached to a workpiece support table.

FIG. 3 is a plan view of the base 20 and the track 60 with a track-mounted member of the invention in the form of a block member 280 secured within the track 60. The track-mounted member is selectively securable at positions along the track 60 and includes a void that may be in the form of, for example, a slot or an open-ended slot. Although the track-mounted member of jig 10 is in the form of a block member 280, it will be understood that the track-mounted member may have any configuration that includes a void and may be mounted at a selected position along the track 60. Referring again to FIG. 3, the base 20 is shown secured to the workpiece support table 150 of the band saw 160, with the saw blade indicated as 151. As best shown in isolation in FIG. 4(a), the block member 280 includes a first member in the form of a forked member 285 having a pair of parallel extending arms 290a and 290b that define a forked slot 300.

A measurement scale 400 may be provided on a surface of the track 60, as shown in FIG. 3, so that it may be referenced by an operator. The scale 400 may be marked in any desired unit of measurement and assists the operator in quickly finding the correct position for the block member 280 so that the jig 10 may be used to form a circular perimeter of a desired diameter. When the block member 280 is secured at the desired point within the track 60, as described below, the center axis of the circular shape may be positioned approximately at the common point on the forked member 285 from which the arms 290a and 290b originate. That common point is generally indicated as "R" in FIGS. 3 and 4(a).

As further shown in FIG. 4(a), the block member 280 also includes a second member in the form of a locking member 310, which is shown in isolation in FIG. 4(b). The locking member 310 includes a lock portion 312 and a screw head 320 having a threaded outer perimeter 315 that threadedly mates with threads on the inner perimeter of a bore 316 in the forked member 285. FIG. 4(a) depicts the screw head 320 of the locking member 310 threadedly disposed in the bore 316 in the forked member 285. It will be understood that by rotating the locking member 310 relative to the forked member 285, the locking member 310 will threadedly advance or retreat within the threaded bore 316, and the distance separating a surface 311 of the locking member 310 and the forked member 285 may be varied. Thus, the effective thickness "T" (see FIG. 4) of a portion of the block member 280 may be varied by rotating screw head 320.

Figure 6:
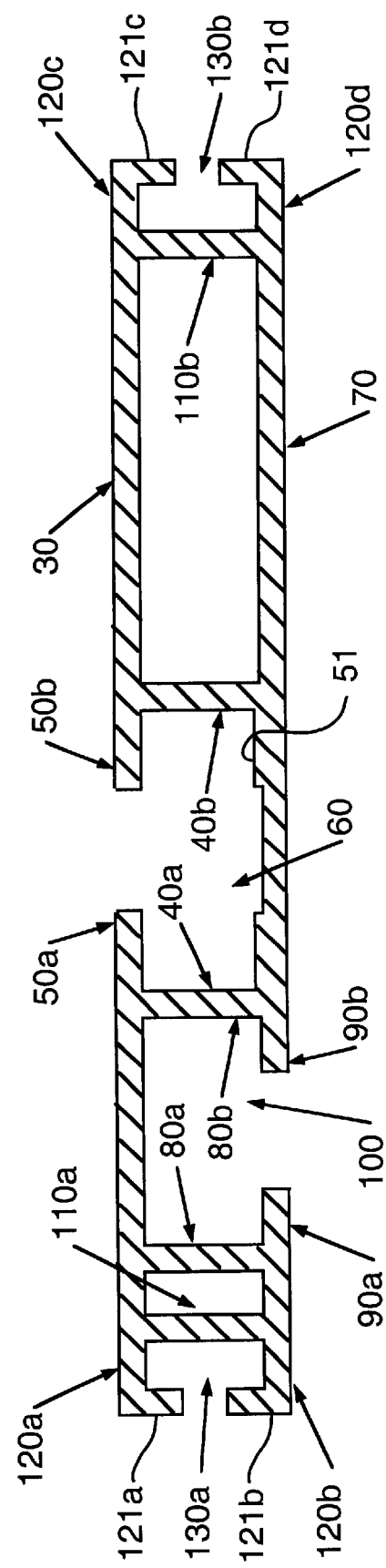
FIG. 6 is a cross-sectional view of the base of the embodiment of the present invention shown in FIG. 1.

Locking the block member 280 within track 60 at the desired position is accomplished as follows. Referring to FIG. 6, a view showing a cross-section of base 20 taken generally perpendicular to a longitudinal axis thereof, it is seen that the pair of internal walls 40a and 40b that define the track 60 each have an inwardly projecting lip portion 50a and 50b. The block member 280 is dimensioned to slide within track 60 between the bottom surface 51 and the lip portions 50a and 50b, partially defining the track 60. Thus, the operator places the block member 280 into the track 60 beneath the inwardly projecting lip portions 50a and 50b, and then slides the block member 280 to the desired position by referring to the measurement scale 400. When the block member 280 is in the desired position, the operator rotates the screw head 320 so as to increase the distance between the forked member 285 and the surface 311 of the locking member 310, thereby increasing the thickness "T" and wedging the block member 280 against the bottom surface 51 and the lip portions 50a and 50b of the track 60. Thus, by appropriately rotating the screw head 320, the operator may secure or unsecure the block member 280 within the track 60 at a desired location.

The engagement of a workpiece, such as workpiece 330 shown in FIG. 1, and the block member 280 will now be described with reference to FIG. 5(a)–(c). A workpiece 330 may be engaged with the block member 280 through the use of a workpiece mounting member in the form of a center pin 340. As shown in FIG. 5(a)–(c), the center pin 340 may have any one of a variety of configurations such as, for example, those depicted as 340a, 340b, and 340c in FIGS. 5(a), 5(b), and 5(c), respectively. Each center pin 340 generally includes both a member or portion that engages the workpiece at the center axis of the desired circular shape and a member or portion that engages the forked slot 300 of the block member 280. Center pin 340a of FIG. 5(a) includes a screw member 350a that is disposed through a bore 361a in mounting portion 360a and is then screwed into the workpiece 330 so as to fasten the mounting portion 360a to the workpiece at the desired center axis. Center pin 340b is a single-piece member including a cylindrical workpiece engaging portion 350b and a cylindrical forked slot engaging portion 360b. The workpiece engaging portion 350b is introduced into a cylindrical bore 331 of a complementary size drilled in the workpiece 330 at the center axis of the desired circular shape. Similarly, one-piece center pin 340c includes a cylindrical workpiece engaging portion 350c and a cylindrical forked slot engaging portion 360c, and the workpiece engaging portion 350c is disposed within a cylindrical bore 331 provided in the workpiece 330. Center pin 340b differs from center pin 340c in that the cylindrical workpiece engaging portions 350b, 350c of the two center pin embodiments are of different lengths and diameters. The selection of an appropriately configured workpiece mounting member will depend upon the character of the workpiece stock and the use to which the final product will be put. For example, if minimum marring of the workpiece surface is desired, a workpiece mounting member in the form of center pin embodiment 340a, which does not require pre-drilling of the workpiece to accept the center pin, may be most appropriate. On the other hand, dense or easily split stock may dictate use of workpiece mounting members of the type embodied in center pins 340b or 340c, which do not require introduction of a screw into the workpiece.

Although the present description focuses on use of the invention in the woodworking setting, it is understood that the invention may also be applied in the cutting, abrading, and machining of other materials, including metals and other highly dense and durable materials. In such applications, workpiece mounting members having the design of center pins 340a, 340b, and 340c may prove impractical, and it may be necessary to use center pins that are attached to the workpiece by a weld, adhesive, or otherwise. In light of the description herein of the function of the workpiece mounting member, other alternate configurations for that element will be apparent to those of ordinary skill in the woodworking, machining, and other arts, and all such alternate configurations are encompassed by the present invention.

Once the center pin 340 has been attached to the workpiece, the forked slot engaging portion of the center pin is disposed between the arms 290a and 290b of the block member 280. The block member 280 will have been secured within the track 60 at a position selected to provide the desired distance between the position "R" of the forked slot 300 and the saw blade of the band saw. For example, once center pin embodiment 340b is engaged to a workpiece 330 by disposing the workpiece engaging portion 350b into a bore 331 in the workpiece 330, the forked slot engaging portion 360b is disposed in the forked slot 300 and may rest within the slot at position "R". The workpiece may then be rotated about position "R" so as to advance the workpiece into the saw blade along a circular path. If it becomes apparent that the position of the block member 280 must be moved to achieve the desired shape, the workpiece 330 and center pin 340b may be slid out of or lifted from the forked slot 300, and the screw head 320 may be appropriately rotated to unsecure the block member 280 within the track 60 and allow the block member 280 to be slid to the proper position in track 60 and again secured in place.

In order to ensure proper positioning of the workpiece relative to the saw blade, the base 20 should be positively and accurately secured in position relative to the saw blade or other driven cutting and/or abrading member. A manner by which the base 20 may be secured to the workpiece support table 150 of the band saw 160 pictured in FIGS. 1 and 2 will now be described with reference to FIGS. 6 and 7.

Figure 7:
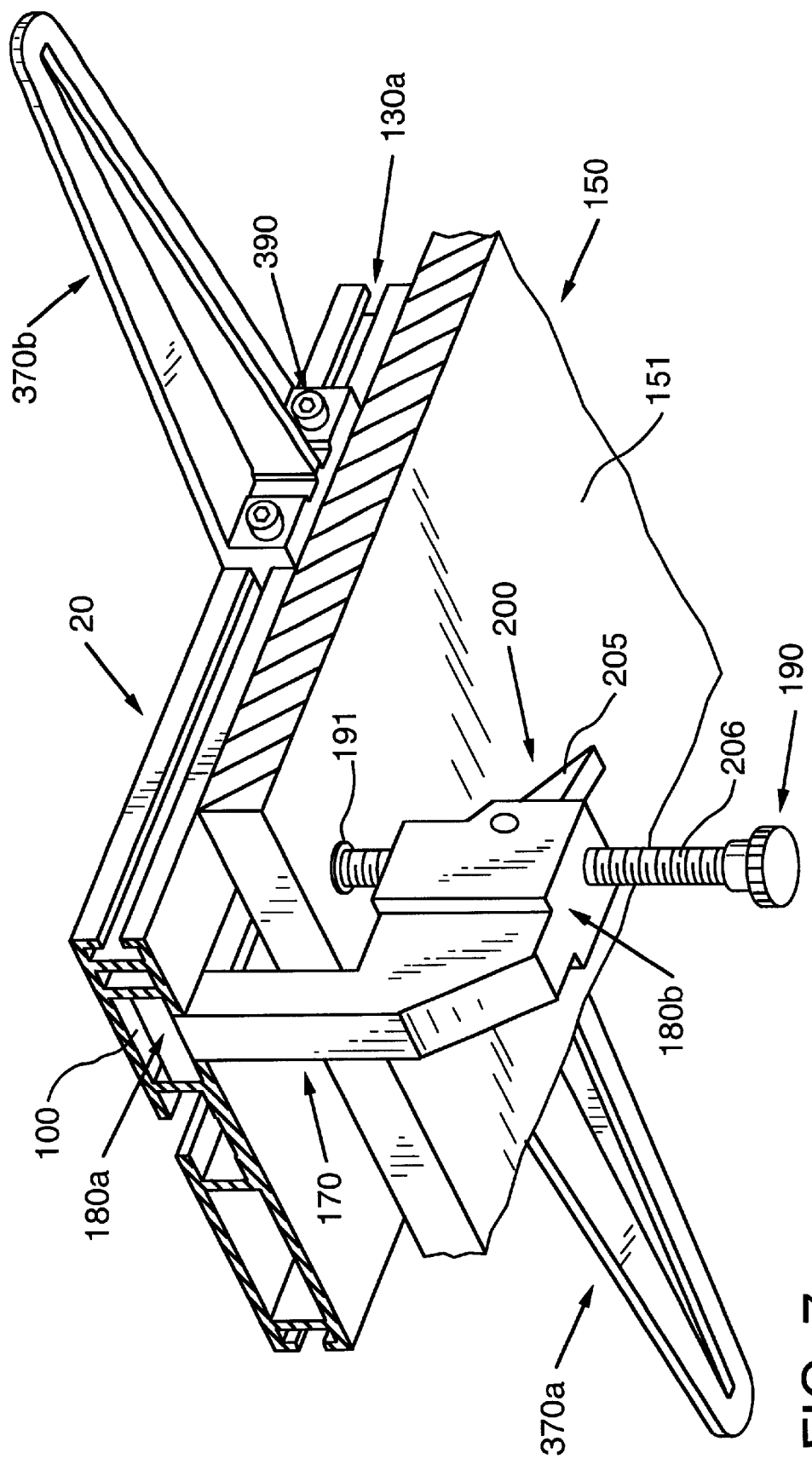
FIG. 7 is an isometric view showing the undersurface of a sectioned portion of the base of the embodiment of the present invention shown in FIG. 1, illustrated attached to a section of a workpiece support table.

FIG. 6 shows that the base 20 may define a second pair of internal parallel walls 80a and 80b formed on the base 20. Walls 80a and 80b define a track 100 in the bottom surface 70 of the base 20. Walls 80a and 80b each includes a depending, inwardly projecting lip portion 90a and 90b, respectively. Referring to FIG. 7, there is shown an attachment device or member in the form of a clamp 170. The clamp 170 generally includes first and second members or ends 180a and 180b and a adjustable member 190 having a table engaging end 191. The second end 180b includes a clamp locking mechanism 200 through which the adjustable member 190 is disposed. The clamp locking mechanism 200 secures the adjustable member 190 in position so that the table engaging end 191 may be secured against the undersurface 151 of the workpiece support table 150. To secure the base 20 to the workpiece support table 150, the operator slides the first end 180a of the clamp 170 into the track 100 of the base 20 to an appropriate position along the track 100, and then positions the base 20 on the workpiece support table 150 as shown so that the workpiece support table 150 is disposed between the base 20 and the second end 180b of the clamp 170. The operator then adjusts the position of the adjustable member 190 so that the table engaging end 191 forcefully contacts the table undersurface 151 and thereby clamps the workpiece support table 150 between the adjustable member 190 and the base 20.

To facilitate the foregoing process of securing the base 20 to a workpiece support table, the clamp locking mechanism 200 may be of a quickly adjustable ratcheting design wherein the table engaging end 191 of the adjustable member 190 may be quickly positioned against the undersurface 151 simply by pushing upward (in the orientation of FIG. 7) on the adjustable member 190 to thereby cause a ratchet mechanism within the clamp locking mechanism 200 to temporarily release the adjustable member 190 and allow it to be moved. Once movement of the adjustable member 190 ceases at the point at which the adjustable member 190 is positioned against the undersurface 151, teeth on the hidden end of trigger 205 engage helical threads 206 on the surface of the adjustable member 190 and prevent it from moving downward and out of contact with the undersurface 151. Additional clamping pressure may be exerted by the adjustable member 190 against the undersurface 151 by rotating adjustable member 190 in a direction to threadedly advance it upward relative to the teeth of the trigger 205 and into more forceful contact with undersurface 150.

The construction of quick adjustable ratchet mechanisms of the type just described will be apparent to those having ordinary skill and, therefore, a more detailed description of the adjustable member 190 and the clamp locking mechanism 200 is not provided herein. In addition, it will be understood that the work holding apparatus of the present invention may include any other means by which the base 20 may be secured to a workpiece supporting table of a cutting and/or abrading device. Possible alternate designs for such securing means include, for example, an arrangement wherein the second end 180b of the clamp 170 includes a threaded bore and a threaded screw is threadedly advanced through the threaded bore so that an end of the threaded screw forcefully contacts the undersurface of the workpiece support table. It will be understood that all such alternate designs are within the spirit and scope of the present invention as expressed in the appended claims.

As illustrated in FIG. 2, the base 20 may be secured to the workpiece support table 150, by the above-described arrangement or otherwise, so that a major portion of the base 20 extends from the table 150 and provides a substantial increase in the effective area on which a workpiece may be supported.

Again referring to FIGS. 1, 2, and 11, the present invention also may include a support stand 210 that is connected to the base 20 and supports the base 20 and any workpiece disposed thereon in a desired orientation and at a desired height above the floor of a workshop. The support stand 210 may be adjustable in length so that the circle cutting and sanding jig 10 may be used with a variety of cutting and/or abrading devices having workpiece support tables at varying heights above the workshop floor. For example, the support stand 210 may comprise a telescoping portion 240 having a hollow first member 240a and a second member 240b that is slidable within the first member 240a. The second member 240b may be slidingly disposed relative to the first member 240a, and the two members may then be locked in position by locking device 241 so as to provide the support stand 210 with a desired length.

Figure 8:
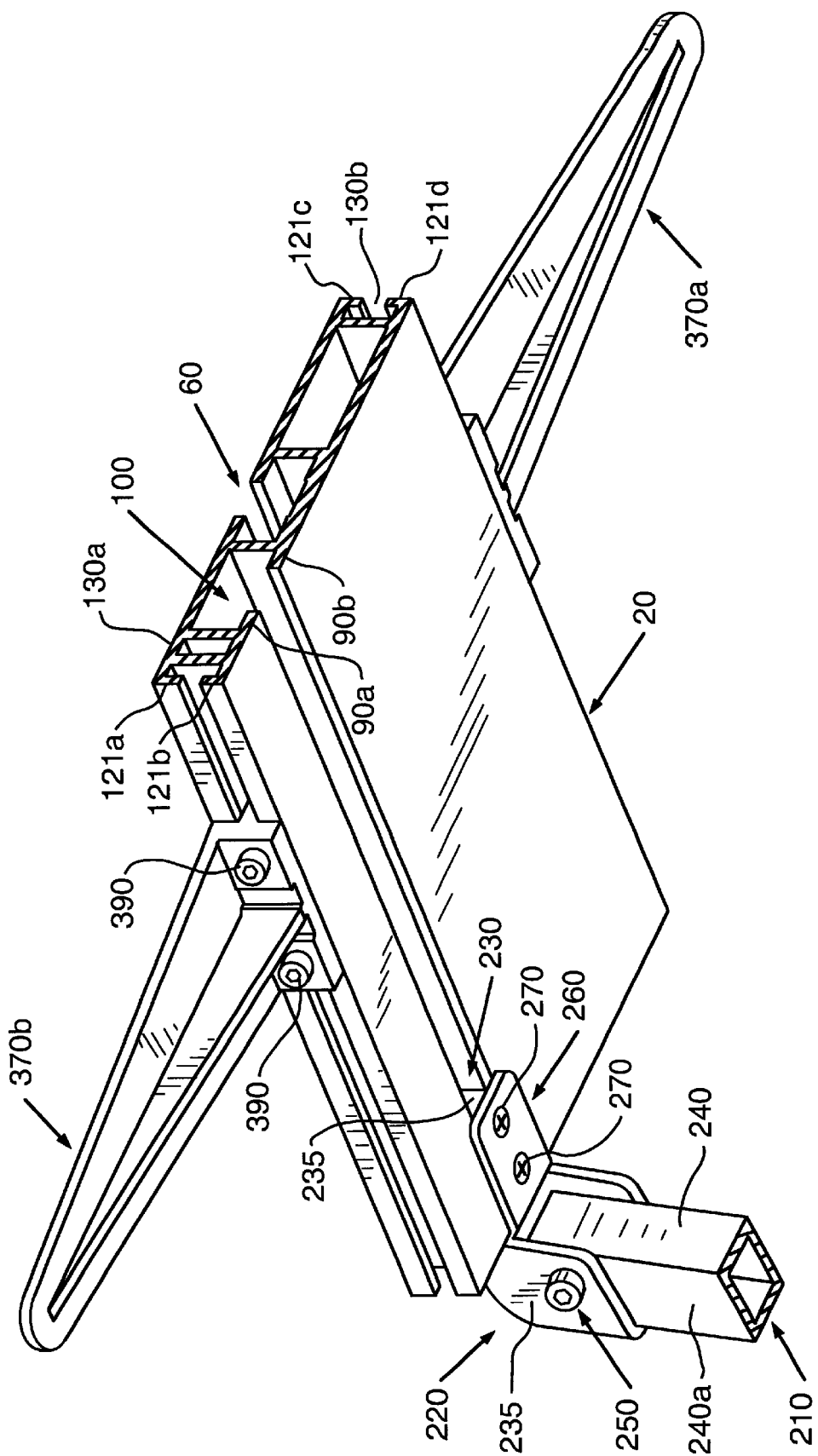
FIG. 8 is an isometric view of the undersurface of the base of the embodiment of the present invention shown in FIG. 1, wherein a manner of securing the support wings and support stand to the base is illustrated.

In order to attach the support stand 210 to the base 20, a hinge member 220 is provided having a base attachment portion 230 that is pivotally connected to a leg attachment portion 235 by fastener 250. The base attachment portion 230 includes an insert portion 235 and a plate 260. The insert portion 235 has a width that closely corresponds to the width of the track 100. The plate 260 is connected to the insert portion 235 by one or more threaded fasteners 270 that threadedly engage threaded bores (not shown) in the insert portion 235. By rotating the threaded fasteners 270, the distance between the plate 260 and the insert portion 235 may be adjusted. As indicated in FIGS. 8 and 11, to connect the leg 210 to the base 20, the insert portion 235 is slid into an end region of the track 100. The one or more fasteners 270 are then rotated to clamp lip portions 90a and 90b of track 100 between the insert portion 235 and the plate 260.

The circle cutting and sanding jig 10 also may include secondary workpiece supports in the form of, for example, support wings 370a and 370b. The support wings 370a and 370b may be of any useful configuration, but are incorporated into jig 10 in the from of arched members extending outward from the base 20 in a direction generally perpendicular to the longitudinal axis of the surface 30 of the base 20. As shown in FIGS. 6 and 8, the support wings 370a and 370b are connected to the base 20 as follows. Base 20 may be provided with two C-shaped tracks 130a and 130b positioned on opposite sides of the base 20. As best shown in FIG. 6, each of the C-shaped tracks 130a and 130b are defined by certain of walls 110a, 110b, 120a–d, and 121a–d. Each support wing 370a and 370b includes an insertion portion (not shown) that is sized to closely fit within each of the C-shaped tracks 130a and 130b. An insertion portion of each support wing 370a and 370b is slid into a respective track 130a and 130b, the wing is positioned as appropriate along the tracks 130a and 130b, and then two fasteners 390 of each support wing 370a and 370b are appropriately rotated to thereby clamp the walls 121a and 121b, or 121c and 121d, as the case may be, between the support wing's insertion portion and the remainder of the respective support wing. Depending upon the dimensions of the workpiece to be disposed on the jig 10, the support wings 370a and 370b may be variously individually positioned at any point along the C-shaped tracks 130a and 130b.

Figure 9:
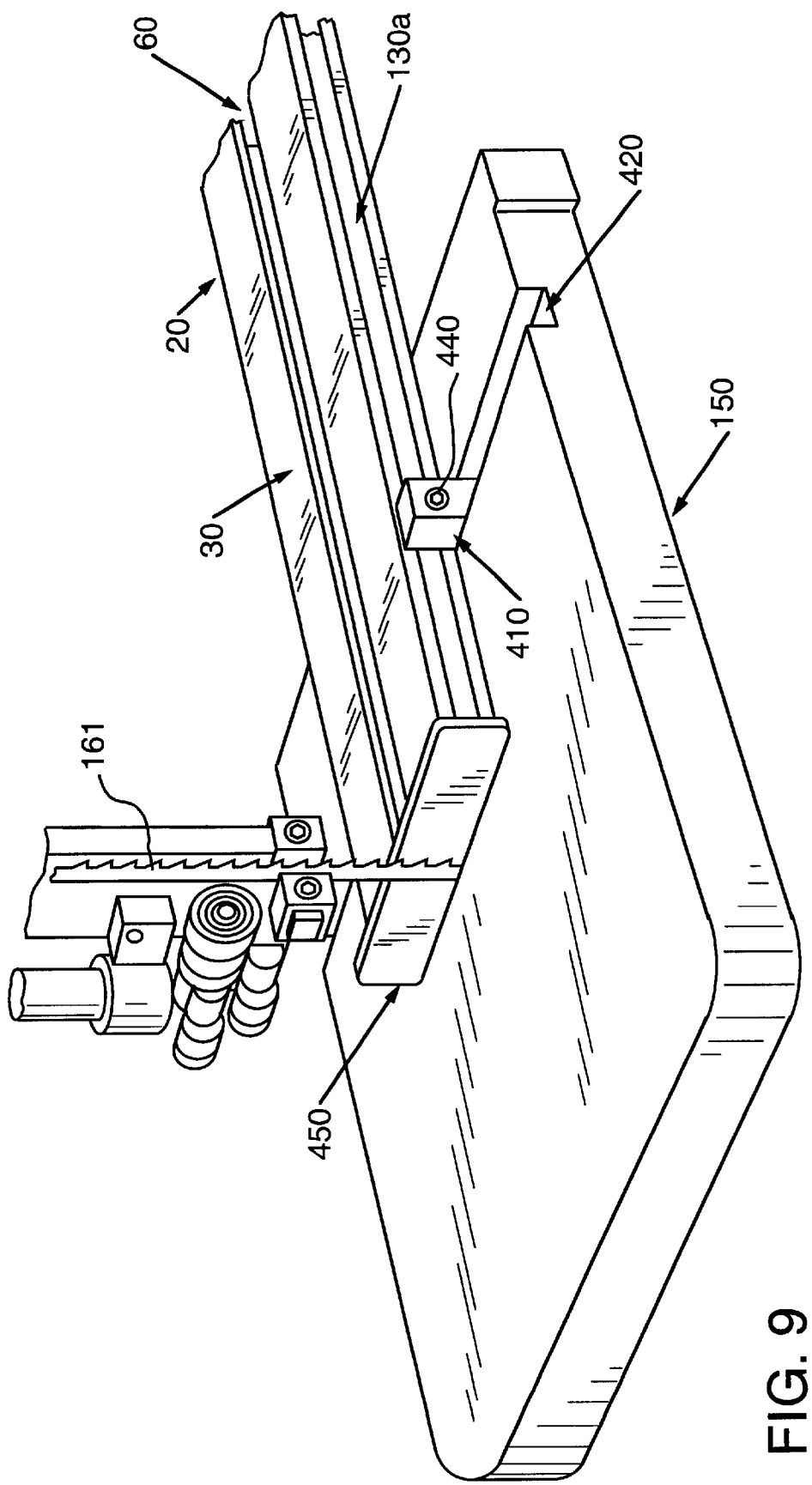
FIG. 9 is an isometric view illustrating a manner of calibrating and securing the embodiment of the present invention shown in FIG. 1 to a workpiece support table.

The present invention also may include a means for calibrating the position of the base 20 to ensure that it is properly oriented relative to the cutting or abrading device to which it is attached. Such proper positioning of the base is necessary to ensure that the measurement scale 400 accurately reflects the distance of the location "R" from the driven cutting or abrading member of the device to which the circle cutting and sanding jig 10 of the present invention is attached. A means for calibrating the apparatus 10 may be understood by reference to FIG. 9, which depicts a calibration bar 450, which may be in the form of a rectangular plate of metal, disposed between the saw blade 161 of the band saw 160 and an end of the base 20. The calibration bar 450 is of a thickness so that the proper spacing between the saw blade 161 and the base 20 is provided. To calibrate the base 20, the calibration bar 450 is positioned against a surface of the saw blade 161, the base 20 is disposed against the calibration bar 450 (so that the bar 450 is disposed intermediate the cutting member 161 and the base 20), and the base 20 is then secured in place by, for example, the clamping arrangement described above. The calibration bar 450 is then removed, and the measurement scale 400 will accurately reflect distances of the center point of a circular from the cutting member 161. It will be appreciated from a consideration of FIG. 9 that the calibration bar 450 may also be used to better ensure that track 60 extends generally perpendicularly outward from flat-shaped cutting members, such as the saw blade 161.

An alternative to immediately securing the base 20 to the workpiece support table 150 by the above-described clamping mechanism while the calibration bar 450 remains in place is to dispose a member such as stop block 410 within a slot 420 provided in the workpiece support surface 150 while also securing the stop block 410 to one of the C-shaped tracks 130a or 130b of the base 20 while the calibration bar 450 is in place. The stop block 410 inhibits lateral or twisting movement of the base 20 relative to the saw blade 161 and thereby serves to maintain the proper positioning of base 20 relative to the saw blade 161 until the above-described clamping mechanism has been secured in place. The stop block 410 may be secured to the base 20 in a manner similar to that employed for the support wings 370a and 370b. Thus, for example, a fastener 440 may be provided to secure the stop block 410 to one of the tracks 130a or 130b of the base 20.

Figure 10:
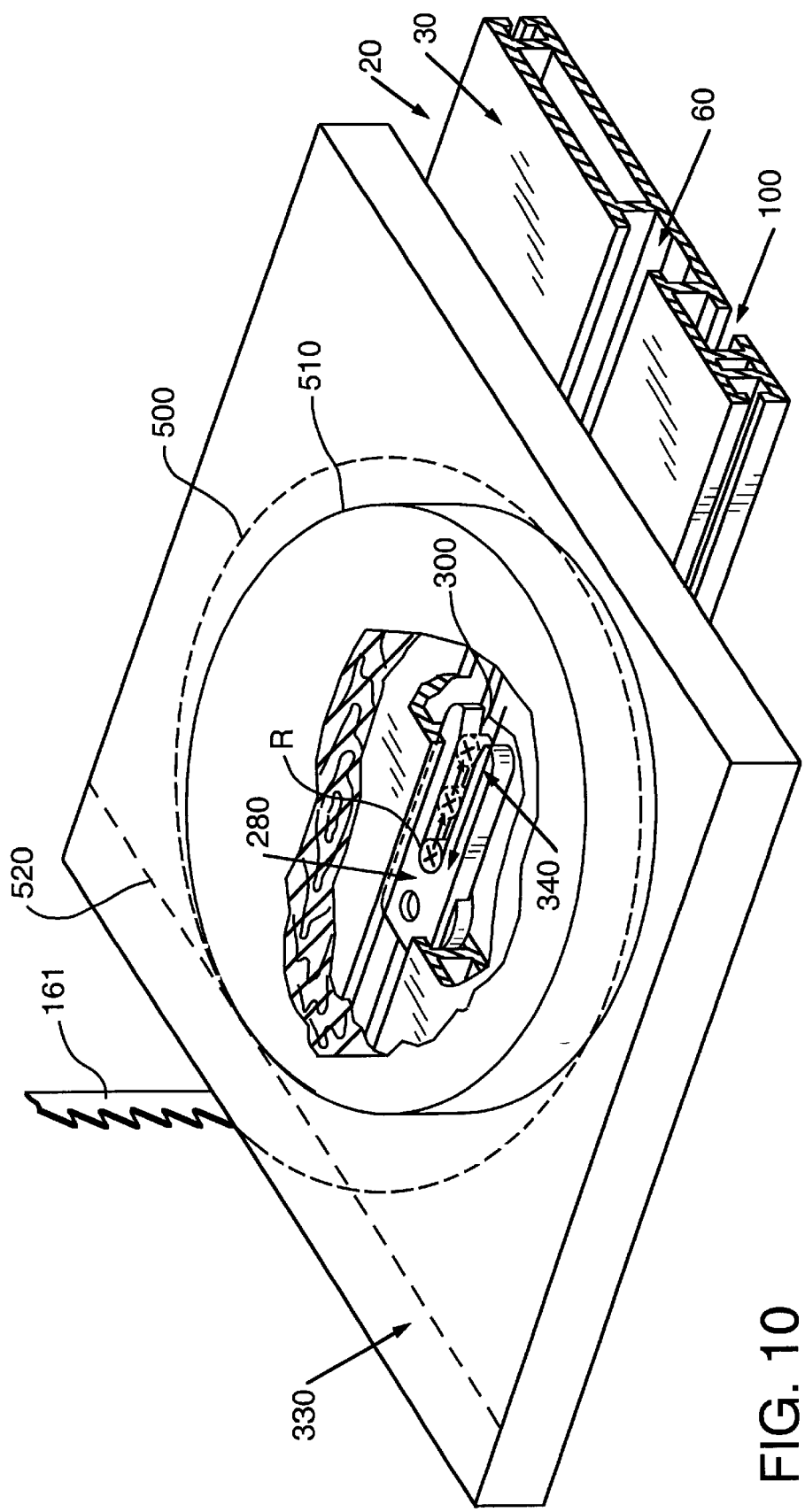
FIG. 10 is an isometric view illustrating a method of the present invention for cutting a circular perimeter using the work holding apparatus of the present invention.

The present invention is also directed to a novel method for providing a workpiece with a circular perimeter. The construction of the circle cutting and sanding jig 10 of the present invention does not require exposing a point on the desired circular perimeter as the point at which the cutting member will begin the circular cut on rotation of the workpiece. Thus, as indicated in FIG. 10, providing the workpiece 330 with the circular perimeter 510 using a conventional circle cutting device would require, for example, that an initial cut be made in the workpiece at, for example, position 520 so as to expose at least one point on the desired circular perimeter 510. Because the circle cutting and sanding jig 10 of the present invention does not utilize a fixed point of attachment between the workpiece 330 and the base 20, such an initial cut as cut 520 is not required. Instead, the construction of the present invention allows the driven cutting member, such as saw blade 161 in FIG. 10, to advance into the workpiece 330 along a spiral path, such as spiral path 500, and eventually reach a point on the desired circular perimeter 510, at which point it may cut in a circular path along the desired perimeter.

To carry out the unique cutting process of the present invention, a workpiece mounting member in the form of, for example, a center pin 340, is attached to the workpiece 330 as described above. The center pin 340 is then disposed within the forked slot 300 in the block member 280. The center pin 340, however, need not initially be positioned at location "R", but instead may be positioned at any location within the fork slot 300 necessary to provide the desired clearance between the center pin 340 and the cutting member 160 to accommodate the dimensions of the workpiece 330. As the workpiece is rotated into the cutting member, the cutting member 160 may trace a spiral pattern, such as spiral path 500. Following the spiral 500 causes the center pin 340 to move within the forked slot 300 progressively closer to the cutting member, i.e., in the direction indicated by the arrow in FIG. 10, until the center pin 340 reaches the location "R". When the center pin 340 reaches location "R", further rotation of the workpiece 330 causes the cutting member to trace the circular perimeter 510 and provide the desired circular shape.

Thus, the unique construction of the work holding apparatus of the present invention, wherein no fixed point of attachment between the workpiece mounting member and the block member is necessary, may do away with the necessity to pre-cut the workpiece to expose at least one point along the desired circular perimeter as the starting point for the cutting member. Such a novel feature may significantly reduce the complexity of and time required to provide workpieces with circular perimeters.

Thus, from the foregoing discussion, it is apparent that the present invention represents a significant improvement over existing work holding devices useful for cutting or abrading circular perimeters. For example, the work holding apparatus of the present invention may be used to form substantially circular perimeters on wooden, metal, and other workpieces of varying size, is more flexible in application than the known devices, and may be quickly and easily installed, calibrated, and adjusted. Also, as is apparent from the accompanying drawings, the length of the base 20 may be selected so as to accommodate very large workpieces that would not be properly supported by the workpiece support tables of typical band saws and other cutting and abrading devices. Thus, the present invention effectively increases the supporting surface of the band saw or other device to which it is attached. Workshop space may be preserved by removing and storing the work holding apparatus of the present invention when it is not in use. When it is to be used, the apparatus may be quickly and easily secured to the workpiece support table of the cutting or abrading device.

Although the present preferred embodiments of the work holding apparatus of the present invention have been described primarily in conjunction with its use with a band saw, it will be understood that the invention may be used in conjunction with any cutting or abrading device having a driven cutting or abrading member and a workpiece support table to which the present invention may be secured. Examples of such devices, in addition to band saws, include jig saws, scroll saws, drum, disk, and/or belt sanding devices, and devices for machining and/or abrading metal and other non-wooden stock. All such applications of the present invention are within the scope of the appended claims. In addition, those of ordinary skill in the art will appreciate that various changes in the details, materials and arrangements of parts which have been herein described and illustrated in order to explain the nature of the invention may be made, and such changes in details, materials, and arrangements remain within the principle and scope of the invention as expressed in the appended claims.

What is claimed is:

1. A method for cutting a workpiece on a device having a driven cutting member to provide a circular perimeter to the workpiece, the method comprising:
   providing an apparatus for positioning the workpiece relative to the driven cutting member, the apparatus including
   a base having a workpiece support surface and a track therein, said track having a wall, a selectively movable track-mounted member having a void, the track-mounted member selectively securable along the track by biasing the track-mounted member against the wall of the track, and a workpiece mounting member longitudinally movable within the void;

mounting the workpiece on the workpiece mounting member, such one end of the workpiece mounting member engages the workpiece and another end protrudes from the workpiece and is unattached to an object;

disposing the unattached portion of the workpiece mounting member within the track for selective longitudinal travel therein; and rotating the workpiece into the driven cutting member and simultaneously advancing the workpiece mounting member along the track into the void toward the driven cutting member.

2. The method of claim 1, wherein during the act of rotating the workpiece into the driven cutting member and simultaneously advancing the workpiece mounting member into the void toward the driven cutting member, the driven cutting member moves through the workpiece in a spiral path.

3. The method of claim 1, wherein the void is an open-ended slot.

4. The method of claim 3, wherein advancing the workpiece mounting member into the void includes sliding the workpiece mounting member within the open-ended slot toward a surface of the open-ended slot nearest the driven cutting member.

5. The method of claim 4, further comprising, after the act of advancing the workpiece mounting member into the void toward the driven cutting member:

contacting the surface of the open-ended slot with the workpiece mounting member; and rotating the workpiece about a point at a fixed distance from the cutting member.

6. An apparatus for positioning a workpiece relative to a device, the apparatus comprising:

a base having a workpiece support surface and a first longitudinal track therein, said first track having a wall;

a selectively movable track-mounted member having a void, said track-mounted member selectively securable along said first track by selectively biasing said track-mounted member against said wall of said first track; and a workpiece-mounting member having one end thereof engaging a portion of the workpiece and the other end thereof unattached to an object and being longitudinally movable within said void.

7. The apparatus of claim 6, wherein the device has a driven member.

8. The apparatus of claim 6, wherein said void is a slot.

9. The apparatus of claim 8, wherein said slot is an open-ended slot.

10. The apparatus of claim 9, wherein said workpiece mounting member is slidable within said open-ended slot.

11. The apparatus of claim 10, wherein said workpiece mounting member comprises a screw and a collar having a bore therethrough, said screw being disposed through said bore.

12. The apparatus of claim 10, wherein said first track includes a measurement scale.

13. The apparatus of claim 10, wherein said track-mounted member includes opposed first and second arms, said first and second arms at least partially defining said open-ended slot.

14. The apparatus of claim 13, further comprising an attachment member mounted on said base and adapted for attaching said base to the device.

15. The apparatus of claim 14, wherein said base includes a second surface opposite said workpiece support surface, said second surface including a second track therein, and said attachment member comprises:

a body having a first end and a second end, said first end received by and slidable within said second track; and an elongate member, said second end receiving said elongate member, a position of said elongate member relative to said second surface being selectable.

16. The apparatus of claim 15, wherein said attachment member includes a quick release ratcheting clamping device.

17. The apparatus of claim 13, wherein said workpiece mounting member includes a first end that may be secured to the workpiece and a second end that is slidable within said slot.

18. The apparatus of claim 17, wherein said first end of said workpiece mounting member is received within a bore in the workpiece.

19. The apparatus of claim 17, wherein said track-mounted member comprises:

a first member, said first member comprising said first and second arms and defining said slot; and a second member having a first surface adjustably connected to said first member for varying a distance between said first surface and said first member.

20. The apparatus of claim 19, wherein said track-mounted member further comprises a threaded member, rotation of said threaded member varying said distance between said first member and said first surface.

21. The apparatus of claim 20, wherein rotation of said threaded member varies said distance between said track-mounted member and said first member to thereby secure said track-mounted member within said track.

22. The apparatus of claim 6, further comprising a support stand connected to said base.

23. The apparatus of claim 22, wherein said support stand includes a hinge member pivotally connected to said base.

* * * * *